(12) United States Patent
Eick et al.

(10) Patent No.: US 12,216,238 B2
(45) Date of Patent: Feb. 4, 2025

(54) FLARING METHODOLOGIES FOR MARINE SEISMIC DATA ACQUISITION

(71) Applicant: CONOCOPHILLIPS COMPANY, Houston, TX (US)

(72) Inventors: Peter M. Eick, Houston, TX (US); Joel D. Brewer, Sealy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 953 days.

(21) Appl. No.: 16/028,102

(22) Filed: Jul. 5, 2018

(65) Prior Publication Data

US 2018/0313967 A1    Nov. 1, 2018

Related U.S. Application Data

(63) Continuation of application No. 13/153,174, filed on Jun. 3, 2011, now abandoned.

(60) Provisional application No. 61/352,098, filed on Jun. 7, 2010.

(51) Int. Cl.
    *G01V 1/38* (2006.01)

(52) U.S. Cl.
    CPC .......... *G01V 1/3826* (2013.01); *G01V 1/3808* (2013.01)

(58) Field of Classification Search
    CPC .................................................. G01V 1/3826
    See application file for complete search history.

(56) References Cited

U.S. PATENT DOCUMENTS

| | | |
|---|---|---|
| 3,241,512 A | 3/1966 | Green |
| 3,303,118 A | 2/1967 | Anderson |
| 3,544,442 A | 12/1970 | Anderson |
| 3,613,069 A | 10/1971 | Cary |
| 3,613,640 A | 10/1971 | Cohen |
| 3,625,852 A | 12/1971 | Anderson |
| 3,731,264 A | 5/1973 | Campbell et al. |
| 3,953,827 A | 4/1976 | Le Moal et al. |
| 3,984,302 A | 10/1976 | Freedman et al. |

(Continued)

FOREIGN PATENT DOCUMENTS

| | | |
|---|---|---|
| EP | 0070494 A1 | 1/1983 |
| GB | 1202988 B1 | 8/1970 |

(Continued)

OTHER PUBLICATIONS

Day, Anthony, et al—"Determining infill specifications based on geophysical criteria", 2005, 75th Annual International Meeting, SEG, Expanded Abstracts, 80-83, 4 pgs.

(Continued)

*Primary Examiner* — Hovhannes Baghdasaryan
(74) *Attorney, Agent, or Firm* — Polsinelli PC

(57) ABSTRACT

A method of determining an optimal flare spacing for streamers towed behind a seismic vessel comprising the steps of: using a computer specially adapted with a seismic data analysis package to analyze prior seismic data for a survey area; analyzing migration broadcast patterns to estimate a maximum sampling distance; calculating a wavelet expansion as a function of flare spacing; creating synthetic gaps in the prior seismic data coverage by dropping traces at different flare spacing; testing capability of different interpolation algorithms in the seismic data analysis package to close the synthetic gaps; and determining an optimal flare spacing based upon the capability of the different interpolation algorithms to close the synthetic gaps.

22 Claims, 5 Drawing Sheets

(56) References Cited

U.S. PATENT DOCUMENTS

| | | |
|---|---|---|
| 4,175,510 A | 11/1979 | Devine |
| 4,256,556 A | 3/1981 | Bennett et al. |
| 3,435,981 A | 8/1982 | Bennett et al. |
| 4,513,029 A | 4/1985 | Sakai |
| 4,686,654 A | 8/1987 | Savit |
| 4,780,856 A | 10/1988 | Becquey |
| 4,793,274 A | 12/1988 | Regone |
| 4,881,211 A | 11/1989 | Meyers |
| 5,050,129 A | 9/1991 | Schultz |
| 5,166,905 A | 11/1992 | Currie |
| 5,322,569 A | 6/1994 | Titus et al. |
| 5,392,255 A | 2/1995 | LeBras et al. |
| 5,410,517 A | 4/1995 | Andersen |
| 5,450,807 A | 9/1995 | Moody |
| 5,517,463 A | 5/1996 | Hornbostel et al. |
| 5,537,366 A | 7/1996 | Gilmour |
| 5,692,451 A | 12/1997 | Pastore |
| 5,719,821 A | 2/1998 | Sallas et al. |
| 5,721,710 A | 2/1998 | Sallas et al. |
| 5,757,726 A | 5/1998 | Tenghamn |
| 5,969,297 A | 10/1999 | Ambs |
| 6,135,041 A | 10/2000 | Hamata |
| 6,418,378 B1 | 7/2002 | Nyland |
| 6,480,440 B2 | 11/2002 | Douma et al. |
| 6,493,636 B1 | 12/2002 | DeKok |
| 6,519,533 B1 | 2/2003 | Jeffryes |
| 6,847,896 B1 | 1/2005 | Orban et al. |
| 6,999,879 B2 | 2/2006 | Houck |
| 7,050,356 B2 | 5/2006 | Jeffryes |
| 7,352,653 B2 | 4/2008 | Cannelli |
| 7,400,552 B2 | 7/2008 | Moldoveano et al. |
| 7,415,936 B2 | 8/2008 | Storteig et al. |
| 7,646,671 B2 | 1/2010 | Pan et al. |
| 7,864,630 B2 | 1/2011 | Chiu et al. |
| 7,869,304 B2 | 1/2011 | Olson et al. |
| 9,001,615 B2 | 4/2015 | Eick et al. |
| 2004/0011265 A1 | 1/2004 | Pastore |
| 2004/0136266 A1 | 7/2004 | Howlid et al. |
| 2005/0128874 A1 | 6/2005 | Herkenhoff et al. |
| 2006/0164916 A1 | 7/2006 | Krohn et al. |
| 2006/0268662 A1 | 11/2006 | Rekdal et al. |
| 2008/0008033 A1 | 1/2008 | Fossum et al. |
| 2008/0008036 A1 | 1/2008 | Morley |
| 2008/0008037 A1 | 1/2008 | Welker |
| 2008/0011540 A1 | 1/2008 | Moldoveanu et al. |
| 2008/0219094 A1 | 9/2008 | Barakat |
| 2008/0285381 A1 | 11/2008 | Moldoveano et al. |
| 2009/0092004 A1 | 4/2009 | Toennessen |
| 2009/0122641 A1 | 5/2009 | Hillesund et al. |
| 2009/0147620 A1 | 6/2009 | Pan et al. |
| 2009/0279388 A1 | 11/2009 | Monk et al. |
| 2010/0002536 A1 | 1/2010 | Brewer et al. |

FOREIGN PATENT DOCUMENTS

| | | |
|---|---|---|
| WO | 9420865 A1 | 9/1994 |
| WO | 95/30912 A1 | 11/1995 |
| WO | 9819181 | 5/1998 |
| WO | 00/60138 | 10/2000 |
| WO | 0204985 | 1/2002 |
| WO | 2009066047 A2 | 5/2009 |
| WO | 2009066049 A1 | 5/2009 |

OTHER PUBLICATIONS

Strand, Christian, et al—"Evaluating infill requirements when acquiring a marine 3D seismic survey along pre-blot lines," 2008, SEG Las Vegas 2008 Annual Meeting, 5 pgs.

Capelle, Philippe, et al—"Intelligent Infill" for cost effective 3D seismic marine acquisitions, 2008, SEG Las Vegas 2008 Annual Meeting, 4 pgs.

Curtis, A., et al, "Active Streamer Positioning—In Action" 2002, EAGE 64th Conference & Exhibition, Florence, Italy, May 2002, 4 pgs.

Szeliski, Richard, et al—"High-Quality Multi-Pass Image Resampling", Technical Report No. MSR-TR-2010-10 Microsoft Pub, Feb. 2010, 23 pgs.

Tropp, Joel A, et al—"Beyond Nyquist: Efficient Sampling of Sparse Bandlimited Signals", 2010, IEEE Transactions on Information Theory 56, Jan. 1, 2010 pp. 520-544; 25 pgs.

Condat, Laurent, et al—"Beyond Interpolation: Optimal Reconstruction by Quasi Interpolation", IEEE International Conference on Image Processing Nov. 2005, pp. 33-36; 4 pgs.

International Search Report, PCT/US2011/039156, Mailed Oct. 11, 2011, 2 pgs.

Van Wijk, K., et al—"Toward Noncontacting Seismology", 2005, Geophysical Research Letters, vol. 32, L01308, XP009131600, Physical Acoustics Laboratory, Department of Geophysics, Colorado School of Mines, Jan. 12, 2005; pp. 1-4; 4 pgs.

Fisher, F.H., et al—"Sound Absorption in Sea Water", 1977, The Journal of the Acoustical Society of America, Sep. 1977, vol. 62, Issue No. 3, pp. 558-564.

"EPBC Act Policy Statement 2.1", Interaction between offshore seismic exploration and whales, Australian Government, Department of the Environment, Water Heritage and the Arts, Sep. 2008, pp. 1-14, Background Paper to "EPBC Act Policy Statement 2.1", 21 pgs.

"Impacts of Marine Acoustic Technology on the Antarctic Environment," SCAR Ad Hoc Group on Marine Acoustic Technology and the Environment, Version 1.2, Jul. 2002, pp. 1-67.

"Assessment of Acoustic Exposures on Marine Mammals in Conjunction with USS Shoup Active Sonar Transmissions in the Eastern Strain of Juan de Fuca and Haro Strait, Washington" National Marine Fisheries Service, Office of Protected Resources, Jan. 2005, pp. 1-13.

"Sodium Hypochlorite—General Information", Powell Fabrication & Manufacturing Inc.; 14 pgs.

"Recommendations for Preparing, Handling and Feeding Sodium Hypochlorite Solutions", Wallace and Tiernan Products; 18 pgs.

"Theory—Chlorine Measurement By Amperometric Sensor", Emerson Process Management, Rosemount Analytical; 3 pgs.

Bordley—"Linear Predictive Coding of Marine Seismic Data", 1983, IEEE Transaction on Acoustics, Speech and Signal Processing, vol. 31, pp. 828-835; 8 pgs.

Chiu, et al—"High Fidelity Vibratory Seismic (HFVS): Optimal Phase Encoding Selection", SEG/Houston 2005 Annual Meeting ACQ 2.2.; 4 pgs.

Egan, Mark S., et al—"The influence of spatial sampling on resolution", 2010, CSEG Recorder, pp. 29-36; 8 pgs.

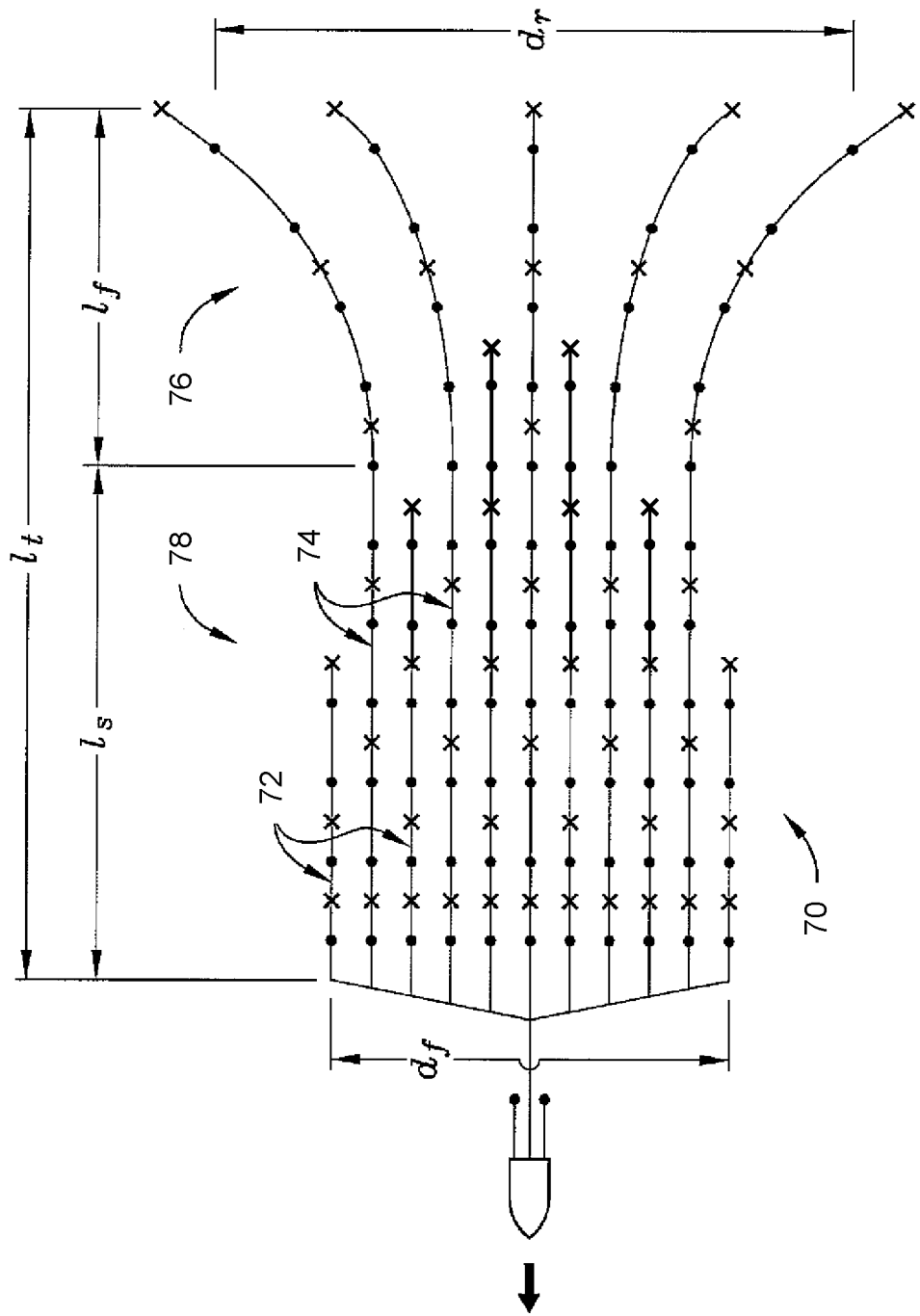

FLARING METHODOLOGIES FOR MARINE SEISMIC DATA ACQUISITION

CROSS-REFERENCE TO RELATED APPLICATIONS

This application is a continuation application which claims benefit under 35 USC § 120 to U.S. application Ser. No. 13/153,174, filed Jun. 3, 2011; and U.S. Provisional Application Ser. No. 61/352,098 filed Jun. 7, 2010, entitled "Flaring Methodologies for Marine Seismic Data Acquisition," which are incorporated herein in their entirety.

STATEMENT REGARDING FEDERALLY SPONSORED RESEARCH

None.

FIELD OF THE INVENTION

This invention relates generally to seismic data acquisition in marine environments using towed streamers behind a tow vessel.

BACKGROUND OF THE INVENTION

Marine seismic exploration investigates and maps the structure and character of subsurface geological formations underlying a body of water. Marine seismic data is typically gathered by towing seismic sources (e.g., air guns) and seismic receivers (e.g., hydrophones) through a body of water behind one or more marine vessels. As the seismic sources and receivers are towed through the water, the seismic sources generate acoustic pulses that travel through the water and into the earth, where they are reflected and/or refracted by interfaces between subsurface geological formations. The seismic receivers sense the resulting reflected and/or refracted energy, thereby acquiring seismic data that provides information about the geological formations underlying the body of water.

Typically, an array of thousands of seismic receivers is used to gather marine seismic data. The seismic receivers are generally attached to streamer cables that are towed behind the marine vessel. It is known that the relative positions of the marine seismic receivers during seismic data acquisition can affect the quality and utility of the resulting seismic data. The conventional paradigm in the industry has been that the streamers should be straight behind the boat and kept equally spaced to maximize the geophysical sampling and to minimize the infill requirements due to missing gaps in coverage.

Unfortunately tides, winds and currents conspire to make this arrangement nearly impossible to acquire for any large survey. These gaps are left with no coverage due to sea states pushing the streamers out of position. These gaps must either be infilled meaning another full pass of the source and receivers towed over the gap to fill in the missing data or interpolated. Currently technology limits of the interpolation algorithms limit the number of missed bins or gaps that can be interpolated to about 4 bins. Thus infill passes are required to cover up the holes left due to changes in the sea states. These sea state changes such as currents, winds, and seas present in many marine environments can cause the relative positions of marine seismic receivers to vary greatly as they are towed through the water. Therefore, it is common for steering devices (commonly known as "birds") to be attached to the streamer cables so that the relative positions (both lateral and vertical) of the seismic receivers can be controlled as they are towed through the water.

A common problem encountered with conventional marine seismic surveys is "gaps" in the acquired seismic data. These data gaps are basically holes in coverage that have no data. They can occur when the spacing between adjacent acquisition passes is too large to provide sufficient resolution for proper data processing. Or gaps in seismic data can be caused by a number of factors including, for example, skewing of the seismic streamers relative to the direction of travel of the towing vessel during data acquisition caused by currents, tides or winds. Even when steerable streamers are employed, gaps in seismic data are common, particularly when strong crosscurrents are present or when acquiring data with a trailing current or even human caused problems of lack of attentiveness of the navigators to their duties. Regardless of the source, if the lack of coverage or hole in the data is wider then the interpolating algorithms available for filling in the missing data, then another pass of the vessel is required to source and receive data over the hole in coverage.

A solution to this problem is to flare the streamers. There are numerous techniques for developing suitable flare spacing for the streamers. Some of these approaches involve trial and error to determine the spacing based upon in-fill requirements (as derived from binning requirements) in seismic acquisition contracts or they may be modeled and derived based upon the processing algorithms available. Generally, interpolation algorithms are required to in-fill the seismic data when slightly greater than an optimal flare spacing is used. However, if the flare spacing is too wide, the algorithm cannot in-fill the data between the streamers, and it will leave unpopulated gaps in the data. When wide gaps in the data are discovered, the areas corresponding to the data gaps must be resurveyed. This process commonly known as "shooting infill" or "infilling." Unfortunately, the existence of gaps in marine seismic data may not be discovered until the initial marine seismic survey has been completed and the resulting seismic data is being processed. Obviously, the in-filling process is undesirable due to the expense of resurveying in-fill areas. Having to shoot extra infill because the streamers were flared too much is nearly as bad as having no flare at all and having to shoot infill due to lack of flaring in the first place.

On the other hand, if the flare spacing is too narrow, the wave field is oversampled. Oversampling is also undesirable due to the inefficiency of collecting overlapping data and the overall expense of the survey. The inventors we have seen and worked with surveys where as much as 50% of the survey was reshot to completely cover the nears and the fars due to having a too narrow flare or no flare on the streamers. This is obviously very expensive.

BRIEF SUMMARY OF THE DISCLOSURE

This invention relates to a method for determining the optimal flare spacing for streamers towed behind a seismic vessel. In particular, the method is based upon geophysical migration broadcast patterns to estimate a maximum sampling distance, and available interpolation algorithms to in-fill any gaps in data coverage. Specifically, the method comprises reprocessing prior seismic data from a survey area, and calculating an in-fill capability for different interpolation algorithms for synthetically generated gaps in the prior seismic data coverage at different flare spacing. An optimal flare spacing may then be determined to avoid oversampling the wave field and to prevent leaving any unpopulated gaps in the seismic data that cannot be in-filled by available interpolation algorithms. This invention strikes a balance between getting the maximum coverage per pass and avoiding shooting unnecessary infill passes caused by missing coverage that cannot be interpolated.

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

A more complete understanding of the present invention and benefits thereof may be acquired by referring to the follow description taken in conjunction with the accompanying drawings in which:

FIG. 5 is an exemplary marine acquisition system in a flared configuration, where the lateral streamer spacing is increasing rearwardly at an increasing rate and the length of the streamers is greater in the center and less great at the outer edges.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
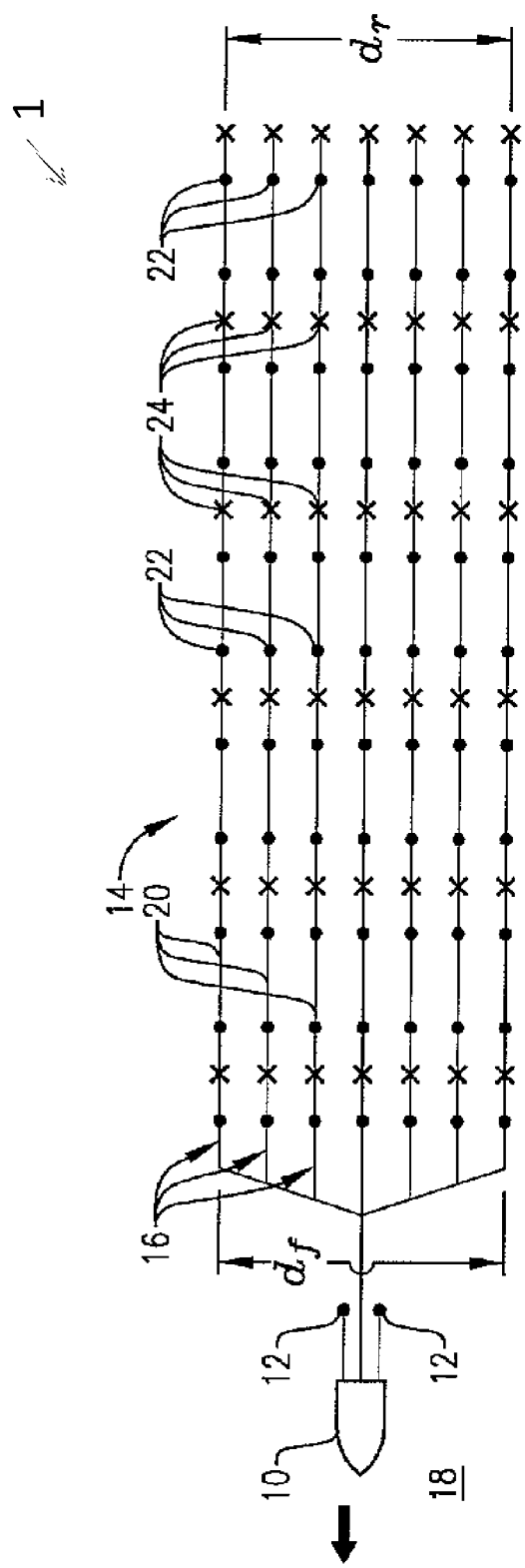
FIG. 1 is an exemplary marine seismic acquisition system, where the lateral streamer spacing is substantially constant over the entire length of the streamers.

An exemplary marine seismic data acquisition system 1, where the streamer spacing is substantially constant over the entire length of the streamers, is shown in FIG. 1. As shown in FIG. 1, the data acquisition system 1 employs a marine vessel 10 to tow seismic sources 12 and a system 14 of steerable seismic streamers 16 through a body of water 18. Each of the seismic streamers 16 includes a streamer cable 20, a series of seismic receivers 22 coupled to the cable 20, and a series of steering devices 24 coupled to the cable 20. During marine seismic data acquisition, the steering devices 24 are used to maintain a desired spacing between the seismic streamers 16.

Figure 2:
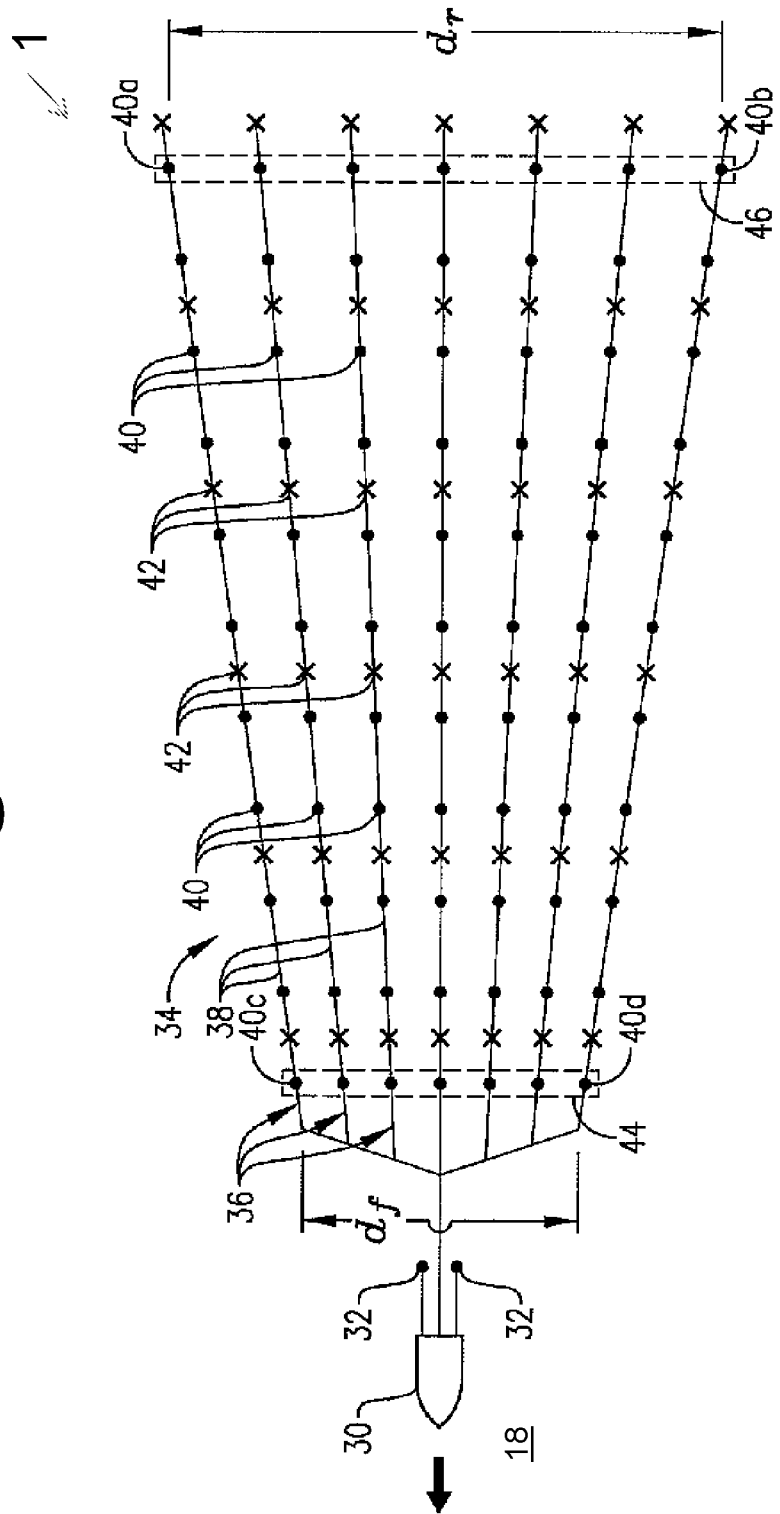
FIG. 2 is an exemplary marine seismic acquisition system in a flared configuration, where the lateral streamer spacing is increasing rearwardly at a substantially constant rate over the length of the streamers.

An exemplary marine seismic data acquisition system 1, where the streamer spacing is increasing rearwardly at a substantially constant rate over the entire length of the streamers, is shown in FIG. 2. As shown in FIG. 2, the data acquisition system 1 employs a marine vessel 30 to tow seismic sources 32 and a system 34 of steerable seismic streamers 36 through a body of water 18 is shown in FIG. 2. Each of the seismic streamers 36 includes a streamer cable 38, a series of seismic receivers 40 coupled to the cable 38, and a series of steering devices 42 coupled to the cable 38. During marine seismic data acquisition, the steering devices 42 are used to maintain a desired spacing between the seismic streamers 36.

Alternatively, the marine vessel 10, 30 may have two or more seismic sources 12, 32, or the vessel 10, 30 may not have any seismic sources 12, 32, such as in the case where the vessel 10, 30 is only towing streamers 16, 36. Further, it may be desirable to use one or more seismic sources 12, 32 in either single or multiple vessel operations. One skilled in the art will recognize that a variety of types of equipment can be employed as the seismic sources 12, 32 depending on the conditions of the marine environment and design parameters of the seismic survey.

The marine vessel 10, 30 should be capable of towing the seismic sources 12, 32 and the system 14, 34 of seismic streamers 16, 36 through the body of water 18 at an appropriate speed. Generally, for the marine seismic data acquisition, appropriate vessel speeds are in the range of about 2 to 10 knots, or, preferably, about 4 to 6 knots.

The marine seismic sources 12, 32 may be any submersible acoustic wave source capable of generating wave energy powerful enough to propagate through the body of water 18 and into a subsea region of the earth, where it is reflected and/or refracted to thereby produce reflected/refracted energy that carries information about the structure of the subsea region and is detectable by marine seismic receivers. The seismic sources 12, 32 employed in the present invention can be selected from a wide variety of commonly known marine seismic sources such as an air gun. These seismic sources are commercially available from a number of companies including ION Geophysical of Houston, Tex. For example, ION Geophysical has the SLEEVE GUN™ that is an air gun.

The individual seismic streamers 16, 36 may include in the range of 10 to 300,000 individual seismic receivers 22, 40, in the range of 100 to 10,000 individual seismic receivers 22, 40, or in the range of 200 to 1,000 individual seismic receivers 22, 40. The seismic receivers 22, 40 employed in the present invention can be selected from a wide variety of commonly known marine seismic receivers. These seismic receivers are commercially available from a number of companies including Teledyne Benthos in North Falmouth, Mass. For example, Teledyne Benthos has the AQ-2000™ that is a seismic receiver.

The seismic streamers 16, 36 illustrated in FIG. 1 are steerable streamers whose lateral positions can be controlled by the steering devices 24, 42 as the streamers 16, 36 are towed through the water 18. Although all the seismic streamers 16, 36 depicted in FIG. 1 are steerable streamers that include steering devices 24, 42, it should be understood that one or more of the streamers 16, 36 may not be equipped with any steering devices. The steering devices 24, 42 employed in the present invention can be selected from a wide variety of commonly known steering devices. These steering devices are commercially available from a number of companies including WesternGeco, LLC in Houston, Tex. For example, WesternGeco, LLC has the Q-FIN™ that is a steering device.

As noted above, FIG. 2 depicts the seismic streamer system 34 in a flared configuration, where the rear portion of the streamer system 34 is wider than the front portion of the streamer system 34. In accordance with one embodiment of the present invention, the seismic streamer system 34 is in a flared configuration when the lateral distance ($d_r$) between the outer-most, rearward-most seismic receivers 40a,b is greater than the lateral distance ($d_f$) between the outer-most, front-most seismic receivers 40*c,d*.

The seismic streamer system 34 illustrated in FIG. 2 has a generally trapezoidal shape, with a substantially constant rate of flaring along the entire length of the seismic streamer system 34. As used herein, the term "rate of flaring" is used to denote the rate at which the average spacing between adjacent seismic streamers increases rearwardly along a certain length of the seismic streamer system.

Figure 3:
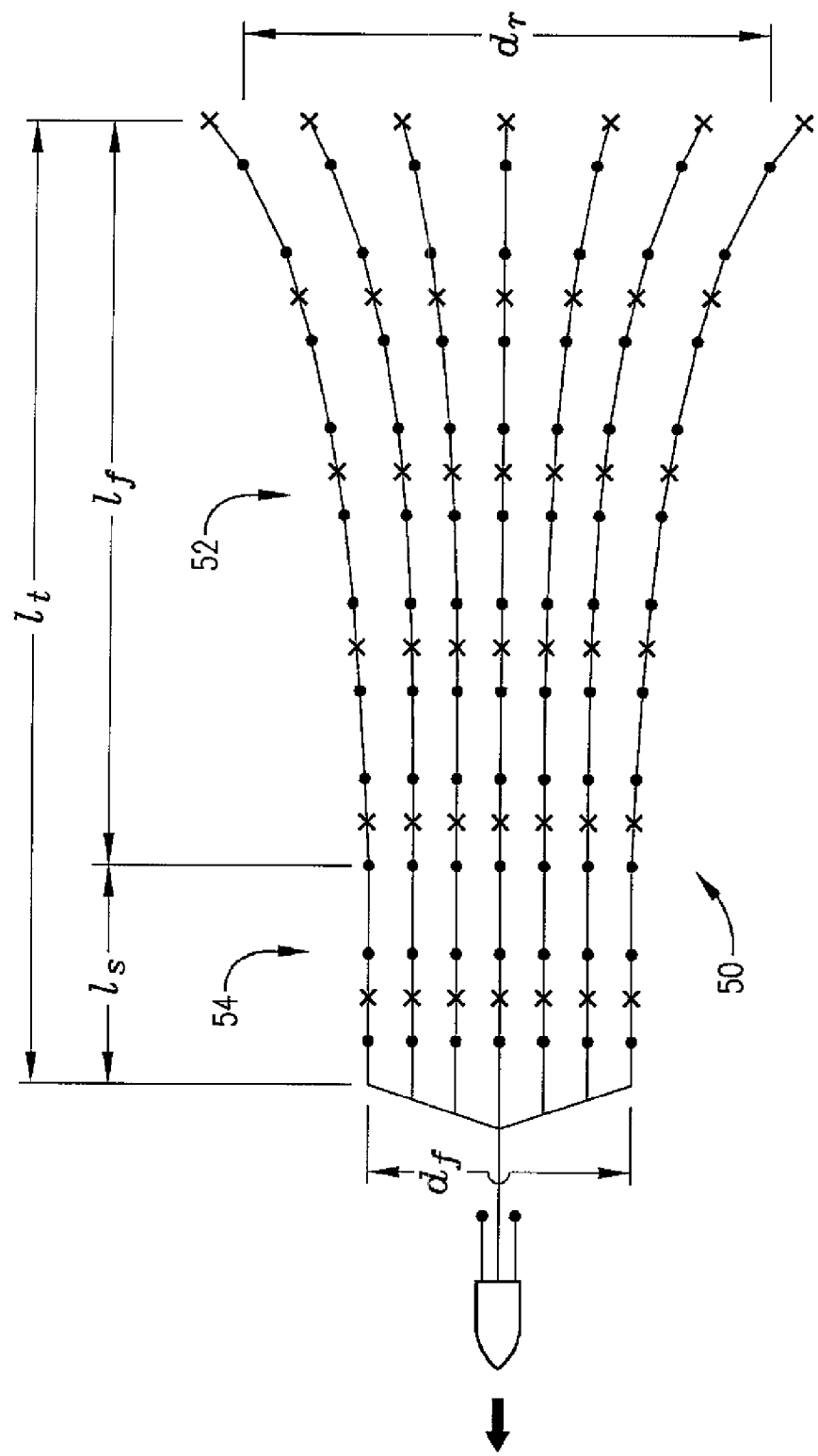
FIG. 3 is an exemplary marine acquisition system in a flared configuration, where the lateral streamer spacing is increasing rearwardly at an increasing rate over the length of the streamers.

FIG. 3 depicts an alternative seismic streamer system 50 in a flared configuration. In particular, the streamer system 50 has a trumpet-shaped configuration, with a rearwardly increasing rate of flaring in a flared section 52 of the seismic streamer system 50. As used herein, the "flared section" of a seismic streamer system is simply the section of the seismic streamer system that is in a flared configuration. Thus, for the streamer system 34 of FIG. 2, the entire length of the streamer system 34 would be considered a flared section. However, for the seismic streamer system 50 of FIG. 3, the flared section 52 has a length ($l_f$) that is less than the total length ($l_t$) of the seismic streamer system 50. As depicted in FIG. 3 the seismic streamer system 50 can also include a non-flared/straight section 54 that exhibits substantially constant streamer spacing over its length ($l_s$).

Figure 4:
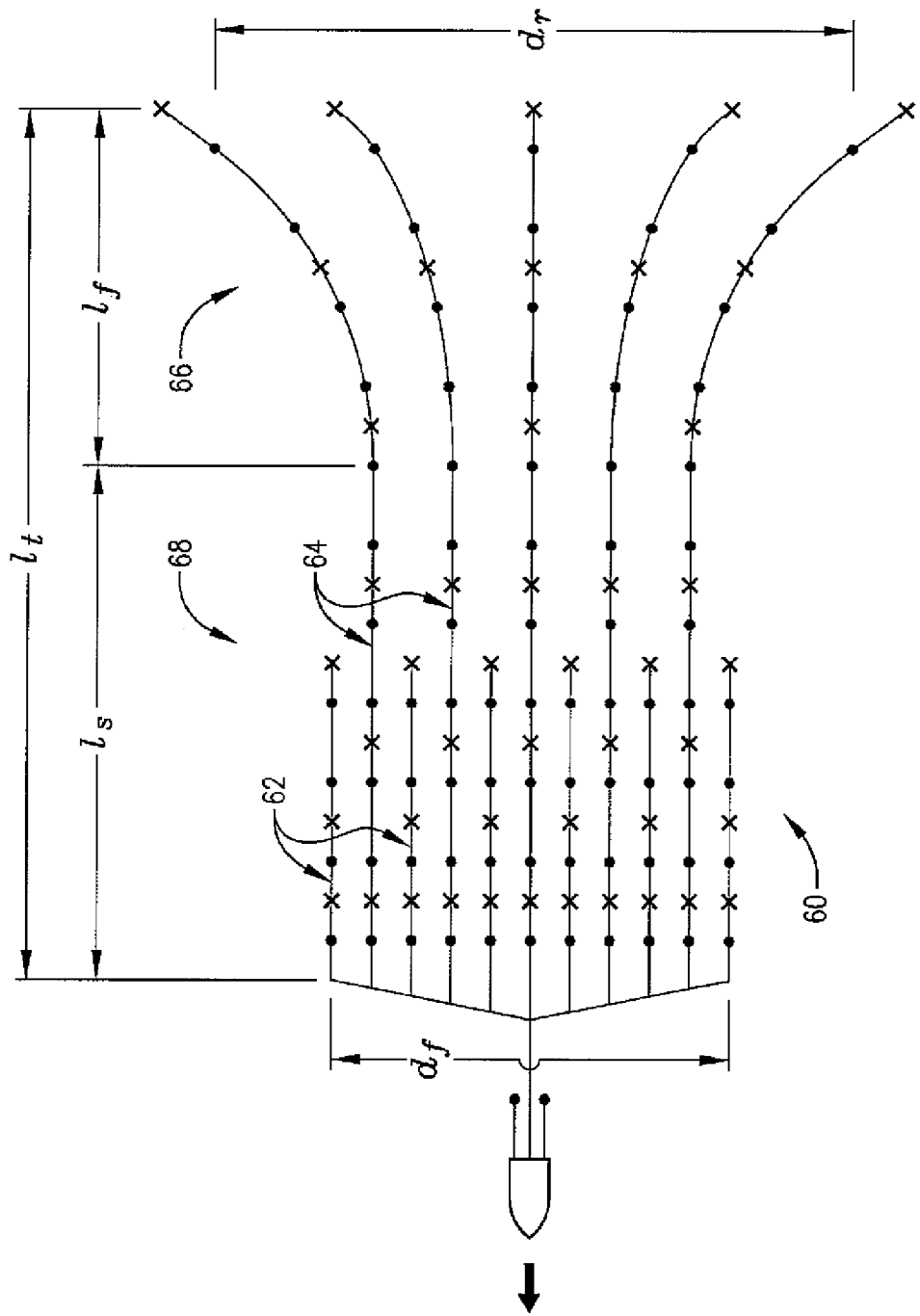
FIG. 4 is an exemplary marine acquisition system in a flared configuration, where the lateral streamer spacing is increasing rearwardly at an increasing rate.

FIG. 4 depicts an alternative seismic streamer system 60 in a flared configuration. The streamer system 60 illustrated in FIG. 4 includes alternating short streamers 62 and long streamers 64. In the configuration illustrated in FIG. 4, the short streamers 62 are not in a flared configuration, but the long streamers 64 include a flared section 66 having a length ($l_f$) that is less than the total length ($l_t$) of the seismic streamer system 60. The seismic streamer system 60 also includes a non-flared/straight section 68 having a length ($l_s$) that is less than the total length ($l_t$) of the seismic streamer system 60.

FIG. 5 depicts an alternative seismic streamer system 70 in a flared configuration that is comparable to the streamer system 60 illustrated in FIG. 4 and includes alternating short streamers 72 and long streamers 74. In the configuration illustrated in FIG. 5, the short streamers 72 are not in a flared configuration but are not the same length. The short streamers 72 are longer at the center of the system 70 and shorter at the outer edges of the system 70. As in FIG. 4, the long streamers 74 include a flared section 76 having a length ($l_f$) that is less than the total length ($l_t$) of the seismic streamer system 70. The seismic streamer system 70 also includes a non-flared/straight section 78 having a length ($l_s$) that is less than the total length ($l_t$) of the seismic streamer system 70.

A method determining an optimal flare spacing for a configuration for streamers is described below. As discussed above, a wide variety of streamer configurations can be employed in the seismic data acquisition process. These streamer configurations include, but are not limited to, the non-flared configuration similar to that illustrated in FIG. 1, or the flared configurations similar to those illustrated in FIGS. 2-5.

The method uses a computer system that is specially adapted with a seismic data analysis package to analyze seismic data. The seismic analysis package is commercially available from a number of companies including Karl Thompson & Associates, GEDCO and Halliburton. For example, GEDCO has the VISTA® 9.0 2D/3D, and Halliburton has the ProMAX® 4D seismic data processing software. In a preferred embodiment, the Karl Thompson & Associates Seisbase™ III software is used as the seismic data analysis package.

In an embodiment, the method analyses geophysical migration broadcast patterns to estimate a maximum sampling distance before adversely compromising the seismic data (i.e., aliasing the data) using the specially-adapted computer system describe above. This estimated maximum sampling distance is a function of the velocities in the survey area, and, therefore, the estimated sampling distance is site dependent. A potentially acceptable flare spacing (for further evaluation) should be less than or equal to the estimated maximum sampling distance.

In an embodiment, the method uses prior 2D or 3D seismic data and a geological model from the survey area, and calculates a wavelet expansion as a function of flare spacing. The wavelet expands with flare spacing (and travel time) so a maximum flare spacing may be estimated to prevent any loss of seismic data quality.

In an embodiment, the method creates synthetic gaps in the seismic data coverage by dropping traces at different flare spacing in the prior data set. The synthetic gap prevents the trace data from being processed. After a synthetic gap is created, the method closes the gaps from the traces, if possible, by testing different interpolation algorithms. Generally, the synthetic gap created by three missing traces can be in-filled accurately using currently available interpolation algorithms, but a gap by four to five traces may be in-filled with varying results, and the gap by six traces cannot be in-filled with current technology. The process may be repeated until all the available interpolation algorithms are exhausted. The gaps that cannot be closed using the available algorithms identify the flare spacing(s) that is/are too large for the current technology. However, it is possible that wider gaps may be closed as the interpolation technology improves, and that larger flare spacing may be implemented without any loss in the seismic data quality.

Available technologies of interpolation algorithms can easily close gaps at flare spacing within about 15% expansion of nominal, and developing technologies may be able to close gaps at flare spacing within about 20 to 30% expansion. For example, one such technology includes interpolation algorithms beyond the nominal Nyquist frequency for digital cameras. See e.g., R. Szeliski, S. Winder and M. Uyttendaele, HIGH-QUALITY MULTI-PASS IMAGE RESAMPLING, Technical Report No. MSR-TR-2010-10 (Microsoft Pub., February 2010); J. A. Tropp, J. N. Laska, M. F. Duarte, J. K. Romberg and R. G. Baraniuk, *Beyond Nyquist: Efficient Sampling of Spare Bandlimited Signals*, IEEE TRANSACTIONS ON INFORMATION THEORY 56(1) (January 2010) 520-44. In particular, a digital image may be accurately wavefield reconstructed beyond the normal aliasing when the pixels are non-uniformly sampled. However, a disadvantage of these types of antialias filters is the potential reduction of final image sharpness with current implementations of the theory.

Another such technology includes a bi-linear quasi-interpolation algorithm. See e.g., L. Condat, T. Blu and M. Unser, *Beyond Interpolation: Optimal Reconstruction By Quasi Interpolation*, IEEE INTERNATIONAL CONFERENCE ON IMAGE PROCESSING 1 (November 2005) 33-36. This algorithm has also shown that about a 20 to 30% expansion is possible. Accordingly, the developing algorithm technology should be able to close gaps at flare spacing within about 20 to 30% expansion of nominal.

In an embodiment, the method uses an actual flare spacing between about eighty percent and about one hundred percent of the maximum flare spacing for marine seismic data acquisition. In another embodiment, the actual flare spacing is between about ninety percent and about one hundred percent of the maximum flare spacing.

From the above-described tests, an optimal flare spacing may be estimated to avoid oversampling the wavefield and to prevent leaving any unpopulated gaps in the seismic data that cannot be in-filled by available interpolation algorithms. Based upon current technology, optimal flare spacing is within about 15% expansion of nominal, and possibly within about 20 to 30% expansion. At a flare spacing within about 15% expansion of nominal, available interpolation algorithms should be capable of closing (i.e., in-filling) any gaps in the seismic data. Further, optimal flare spacing for the current technology can be identified prior to any data acquisition for a new survey.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. US 2010-0002536-A1 (Peter M. Eick and Joel D. Brewer); "CUTTING MARINE SEISMIC ACQUISITION WITH CONTROLLED STREAMER FLARING" (2010).

The invention claimed is:

1. A method for marine seismic data acquisition, the method comprising:
   using a computer specially adapted with a seismic data analysis package to analyze prior seismic data for a survey area;
   selecting a flare spacing for a streamer configuration, the streamer configuration including a plurality of seismic receivers having a first lateral distance between outer-most, rearward-most seismic receivers that is greater than a second lateral distance between outer-most, front-most seismic receivers;
   creating synthetic gaps in coverage of the prior seismic data by dropping a trace at different flare spacing;
   testing capability of different interpolation algorithms to close the synthetic gaps created by the trace with the flare spacing; and
   determining an optimal flare spacing for the streamer configuration based upon the capability of the different interpolation algorithms to close the synthetic gaps.

2. The method of claim 1, further comprising:
   selecting an actual flare spacing for marine seismic data acquisition.
3. The method of claim 1, wherein the prior seismic data is 2D seismic data.
4. The method of claim 1, wherein the prior seismic data is 3D seismic data.
5. The method of claim 1, wherein the optimal flare spacing is within 12% of nominal.
6. The method of claim 1, wherein the optimal flare spacing is within 20% of nominal.
7. The method of claim 1, wherein the optimal flare spacing is within 10% to 25% of nominal.
8. The method of claim 1, wherein the optimal flare spacing is within 10% to 30% of nominal.
9. A method for marine seismic data acquisition, the method comprising:
   obtaining prior seismic data for a survey area in a marine environment;
   preventing trace data in the prior seismic data from being processed by creating one or more synthetic gaps in the prior seismic data;
   testing a capability of different interpolation algorithms to close the one or more synthetic gaps; and
   determining an optimal flare spacing for a streamer configuration based upon the capability of the different interpolation algorithms to close the one or more synthetic gaps.
10. The method of claim 9, further comprising:
    creating a wavelet expansion using the prior seismic data, the wavelet expansion being a function of a flare spacing.
11. The method of claim 10, wherein the wavelet expansion is further created using a geological model of the survey area.
12. The method of claim 9, wherein the optimal flare spacing is within 15% expansion of nominal.
13. The method of claim 9, wherein the optimal flare spacing is within 20%-30% expansion of nominal.
14. Th method of claim 9, wherein the optimal flare spacing avoids wavefield oversampling.
15. The method of claim 9, wherein the optimal flare spacing prevents any unpopulated gaps that cannot be in-filled by the different interpolation algorithms.
16. The method of claim 9, wherein the streamer configuration is a flared configuration or a non-flared configuration.
17. The method of claim 16, wherein the flared configuration includes a rear portion of a streamer system being wider than a front portion of the streamer system.
18. The method of claim 9, wherein the streamer configuration includes a constant rate of flaring along an entire length of a seismic streamer system.
19. The method of claim 9, wherein the streamer configuration includes a rate of flaring that is rearwardly increasing along a length of a seismic streamer system.
20. The method of claim 9, wherein the streamer configuration includes a first plurality of streamers having a first length and a second plurality of streamers having a second length, the first length being less than the second length.
21. The method of claim 20, wherein the first plurality of streamers is in a non-flared configuration and the second plurality of streamers includes a flared section.
22. The method of claim 20, wherein at least one of the first plurality of streamers or the second plurality of streamers has varying streamer lengths.

* * * * *